United States Patent [19]

Holz

[11] Patent Number: 4,612,682

[45] Date of Patent: Sep. 23, 1986

[54] APPARATUS FOR TREATING MEAT

[75] Inventor: Ernst Holz, Heidenheim, Fed. Rep. of Germany

[73] Assignee: Holac Maschinenbau GmbH, Heidenheim, Fed. Rep. of Germany

[21] Appl. No.: 671,105

[22] Filed: Nov. 13, 1984

[30] Foreign Application Priority Data

Jul. 12, 1983 [DE] Fed. Rep. of Germany ....... 3344284

[51] Int. Cl.[4] .............................................. A22C 9/00
[52] U.S. Cl. ...................................................... 17/26
[58] Field of Search ....................................... 17/26, 27

[56] References Cited

U.S. PATENT DOCUMENTS

| | | | |
|---|---|---|---|
| 881,204 | 3/1908 | Smith | 17/26 |
| 1,986,075 | 1/1935 | Spang | 17/26 |
| 1,991,439 | 2/1935 | Wood | 17/26 |
| 2,291,809 | 8/1942 | Jackson | 17/27 X |
| 2,640,334 | 6/1953 | Spang | 17/26 X |
| 2,682,078 | 6/1954 | Brown | 17/26 |
| 2,690,011 | 9/1954 | Schulze | 17/26 X |
| 4,525,896 | 7/1985 | Leining et al. | 17/26 X |

*Primary Examiner*—Willie G. Abercrombie
*Attorney, Agent, or Firm*—Walter H. Schneider

[57] ABSTRACT

Apparatus for treating meat, in particular for the purpose of improving its ability to absorb a curing liquid prior to cooking, comprises a frame mounting at least two spaced-apart side-by-side rollers which are rotated in opposite senses as meat to be treated is passed therebetween. To improve the effectiveness of treatment, the rollers are formed as pressure rollers arranged such that the spacing therebetween automatically varies to accommodate different thicknesses of meat. Preferably, each pressure roller is removably mounted in the frame by connecting one end of the roller to a drive shaft by a quick-release coupling and by mounting the other end in a bearing assembly releasably connected to the frame.

2 Claims, 4 Drawing Figures

4,612,682

APPARATUS FOR TREATING MEAT

FIELD OF THE INVENTION

The invention relates to apparatus for treating meat, the apparatus being of the type including a frame mounting at least two spaced-apart side-by-side rollers which, in use of the apparatus, are rotated in opposite senses as meat is passed therebetween. In particular, but not exclusively, the invention relates to apparatus of the aforesaid type intended to be used for treating meat that is to be cured for cooking, this treatment serving to improve the ability of the meat to absorb a curing liquid such as brine.

DESCRIPTION OF THE PRIOR ART

German Offenlegungsschrift No. 27 00 125 describes apparatus of the above-mentioned type which is associated with a device for injecting curing brine. This device is followed by a so-called massage drum in which the meat injected with curing brine is maintained in constant motion in brine for a few hours in order for the meat to absorb and/or retain as much curing brine as possible.

The meat-treatment apparatus, which is disposed above the injection device for the curing brine, comprises two counter-rotating rollers provided with a plurality of blades which serve to impart fine perforations to the meat to be treated. The purpose of these perforations is to enable the curing brine to penetrate more deeply into the meat.

It has been found, however, that meat pre-treated in this way can still only absorb curing brine to a limited extent, and that the brine is not durably retained so that there is a risk of the curing brine escaping during and after cooking. A further disadvantage is that the treated meat requires a fairly long time in the drum to take up curing brine.

German Patent No. 30 02 636 also describes a method and apparatus for the preparation of cured products for cooking; in this case the meat, after injection with curing brine and before agitation and/or circulation in brine, is subjected to high mechanical pressure between a pressure roller 17 and a transport roller 18. This pressure is claimed to cause opening up of the fibrous structure and overstretching of the muscle tissue, whereby to enable rapid penetration of curing brine into the muscle fibre. By this measure, it is claimed that the subsequent agitation and/or circulation process in brine can be reduced to less than one hour.

However, this method and apparatus has been found still to suffer from the disadvantage that the absorbed curing brine is only inadequately retained, so that the risk remains of the brine escaping again during or after cooking. Furthermore, this apparatus is relatively elaborate in construction, and its field of application is limited.

An object of the present invention is therefore to provide apparatus of the aforesaid type which facilitates the treatment of meat, for example, to provide for an improved take up and retention of curing brine by the meat. A further object of the invention is to provide apparatus that is capable of general usage.

SUMMARY OF THE INVENTION

According to the invention, this object is achieved by the provision of apparatus of the aforesaid type, wherein the rollers are in the form of pressure rollers so arranged that, in use, the spacing therebetween automatically varies to accommodate different thicknesses of meat.

Thus in contrast to the apparatus described in German Offenlegungsschrift No. 27 00 125 where bladed rollers are used to make a plurality of perforations in the meat, the apparatus of the present invention uses pressure rollers. These pressure rollers serve both to crush the meat's muscle fibres and - more importantly - to open and tear apart its protein cells. As a result, the treated meat acts practically like a sponge, and the subsequently injected brine is reliably retained in the broken protein cells to a substantial degree even during cooking.

Due to the fact that this treatment is performed prior to the injection of curing brine into meat products to be cured for cooking, the meat treated in this way can absorb substantially more curing brine than meat treated, for example, in accordance with the method described in German Pat. No. 30 02 636. In addition, the subsequent circulation treatment time is shorter for meat treated by apparatus of the present invention.

To accommodate different meat sizes, the distance between the rollers is arranged to vary automatically, for which purpose at least one of the pressure rollers is variably mounted in the frame. This mounting may, for example, be via a swivel arm carrying the pressure roller, the swivel arm having an associated displacement mechanism.

Instead of mounting one of the rollers in a swivel arm, the roller can be mounted in a linearly displaceable member to enable the distance between the rollers to be varied as required, the mounting member being displaceable towards and away from the opposite roller by a suitable displacement mechanism.

However the displaceable pressure roller is mounted, the displacement mechanism may comprise a pneumatic or hydraulic cylinder coupled by its piston rod to the roller-mounting member. Of course, the displacement mechanism may be mechanical in form. Advantageously, however, the displacement mechanism is a pneumatic cylinder as it enables the roller pressure to be accurately set and maintained by means of corresponding control devices. In this way, pressure treatment of the meat can be performed with high precision.

The pressure rollers may take many forms. Thus, the rollers may be provided with ribs, pins, projections or the like on their peripheral surfaces and these components may be shaped and have an extent appropriate to a specific applications. Thus, ribs of rectangular cross-section, or pointed or blunt wedge-shaped teeth may be provided which may be arranged parallel or angled relative to the generatrices of the rollers.

Due to its simple design and the self-adjusting capability of the pressure rollers, the apparatus according to the invention can be used quite generally.

In a highly advantageous embodiment, the pressure rollers are mounted removably in the frame. Such an arrangement substantially extends the range of application of the present apparatus, since if required, the pressure rollers can be exchanged very rapidly enabling the apparatus to be used, in addition for the treatment of cured products to be cured for cooking, also for the treatment of other kinds of meat, e.g. steaks, cutlets, bacon and the like, simply by the insertion of appropriate rollers.

Quick and easy exchange of the pressure rollers can be achieved by arranging for each pressure roller to be connected at one end to a driving shaft by a quick-release coupling, and to be mounted at its other end in a bearing assembly releasably connected to the frame.

Due to this arrangement removal of a pressure roller simply involves the release of the roller from the quick-release coupling, and its removal together with the bearing assembly from the frame.

Various known couplings may be used as said quick-release coupling. In one possible arrangement, the coupling consists of an adaptor which is provided on its side facing the pressure roller with a stepped bore into which extend a projection and a drive-connecting piece rigid with the roller.

The pressure-roller drive connection is made via the drive connecting piece which may, for example, be provided with two opposed flat zones that engage with corresponding surfaces of the stepped bore of the adaptor. Of course, instead of a drive-connecting piece of this form, other rotary connections can be used, for example, key and keyway, splined shaft or jaw couplings.

The bearing assembly may comprise a bearing disc which is provided with a bearing arranged to receive a stub axle of the pressure roller. By arranging for the outside diameter of the bearing disc to be greater than the maximum diameter of the pressure roller, and also for the bearing disc to releasably seat in an aperture in the frame, once the bearing disc has been removed from the frame, the pressure roller can be simply withdrawn laterally through the vacated frame aperture on account of its smaller diameter.

One possible way of releasably connecting the bearing disc to the frame consists in providing the bearing disc with a stop ring of greater diameter than the bearing disc, this stop ring being connected to the frame by a quick-release locking arrangement.

The locking arrangement may take any suitable form, such as, for example, a bayonet coupling, thumbscrews or the like.

Advantageously, a displaceable stop is provided in the frame for setting and adjusting a minimum distance between the pressure rollers.

This stop is set according to the approximate size of the meat to be treated such that the meat is reliably drawn in between the two pressure rollers. Fine variations of the spacing between the rollers is effected by means of the displacement mechanism in dependence on the preselected pressure the latter causes the rollers to exert on the meat being treated.

Adjustment of the stop may easily be achieved by making it in the form of an adjusting screw which is screw-engaged in a cross member of the frame and is arranged to contact the displacement mechanism or the swivel arm.

Preferably, the pressure rollers have respective independent drive mechanisms, for example, separate drive motors. Such an arrangement enables the pressure rollers to be driven at different speeds, so that in addition to the compressive forces, shear forces can also be exerted on meat being treated which further improves tearing apart of the muscle tissue or protein cells of the meat.

If required, more than one pair of opposed pressure rollers can be provided, such further pairs of pressure rollers being arranged spaced apart from, but adjacent to, each other in the direction of advance of meat undergoing treatment.

BRIEF DESCRIPTION OF THE DRAWINGS

Apparatus, embodying the invention, for treating meat to improve its ability to absorb a curing liquid, will now be particularly described, by way of example, with reference to the accompanying diagrammatic drawings, in which.

DESCRIPTION OF THE PREFERRED EMBODIMENT

Figure 1:
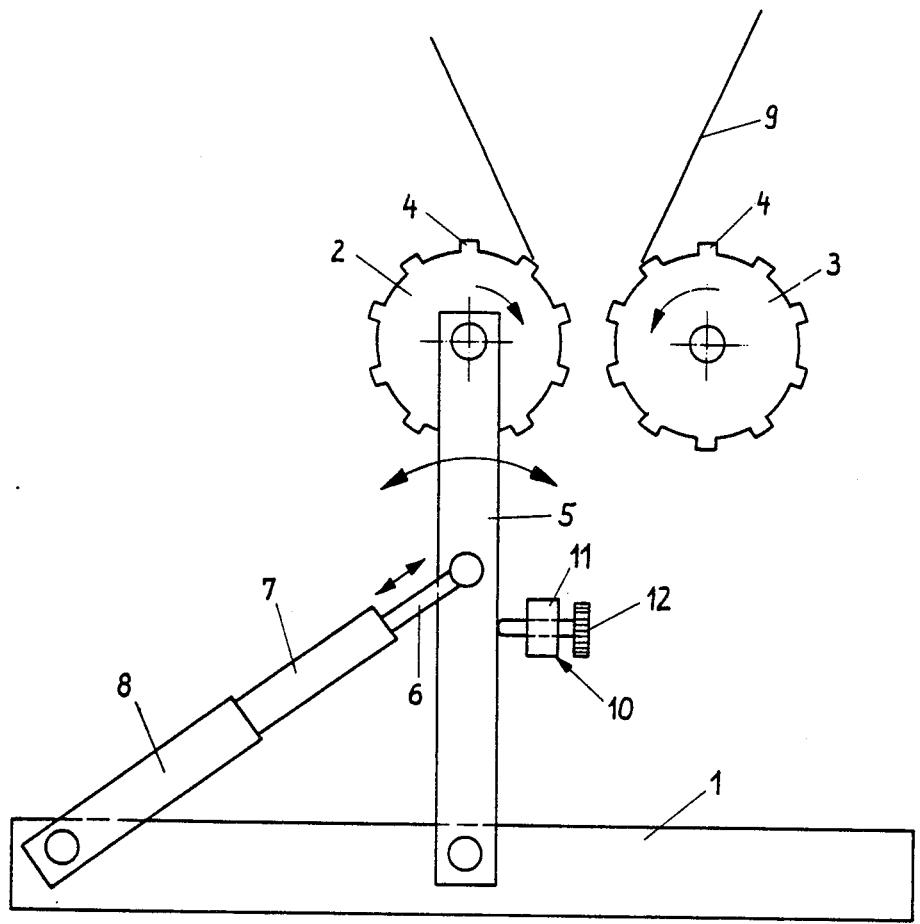
FIG. 1 is a simplified side elevation of the apparatus.

The apparatus shown in the drawings comprises a frame 1, not illustrated in detail, upon which are mounted two spaced-apart opposed parallel pressure rollers 2 and 3. The pressure rollers 2, 3 are at least approximately cylinder-shaped and have distributed over their peripheral surfaces a plurality of pins, ribs, hammer-like projections 4 or the like. For simplicity, these components will be referred to below as ribs 4.

The ribs 4 extend along the generatrices of the rollers over substantially the whole length thereof. Of course, these ribs may alternatively be discontinuous in form and may, instead of being arranged parallel to the longitudinal axis of the pressure roller, be arranged at an angle to this axis, that is, helically of the roller.

Whereas one pressure roller 3 is mounted in a fixed position in the frame 1 by means of frame sections (not shown), the other pressure roller 2 is pivotably connected to the frame 1 by a swivel arm 5. The mounting of pressure roller 2 in the swivel arm 5 can be effected in the same manner as the mounting of pressure roller 3 in the frame itself and preferably both rollers 2, 3 are mounted in a manner facilitating their removal. One suitable form of mounting arrangement for the rollers will be described hereinafter with reference to FIG. 2.

The swivel arm 5 is coupled to the piston rod 6 of a pneumatic cylinder 7 which in turn is mounted pivotably in the frame 1 by means of a supporting arm 8.

Meat products to be treated are fed into the apparatus from above via a funnel 9 to pass down between the two pressure rollers 2 and 3.

A cross member 11 rigid with the frame 1 acts as a stop 10 for setting a minimum gap between the two pressure rollers 2 and 3, this gap being made adjustable by means of an adjusting screw 12 screwed through the cross member 11 and abutting the front of the swivel arm 5.

Figure 2:
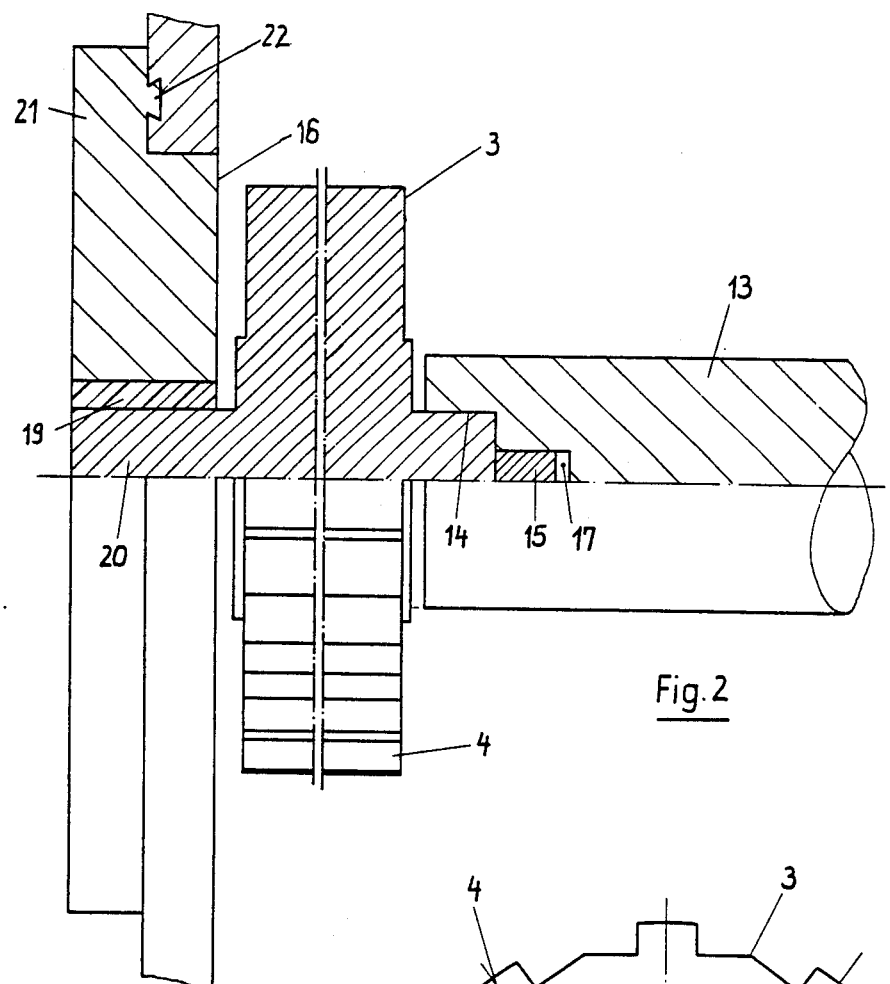
FIG. 2 is an enlarged partial longitudinal section through a pressure roller of the apparatus showing its manner of mounting.
Figure 3:
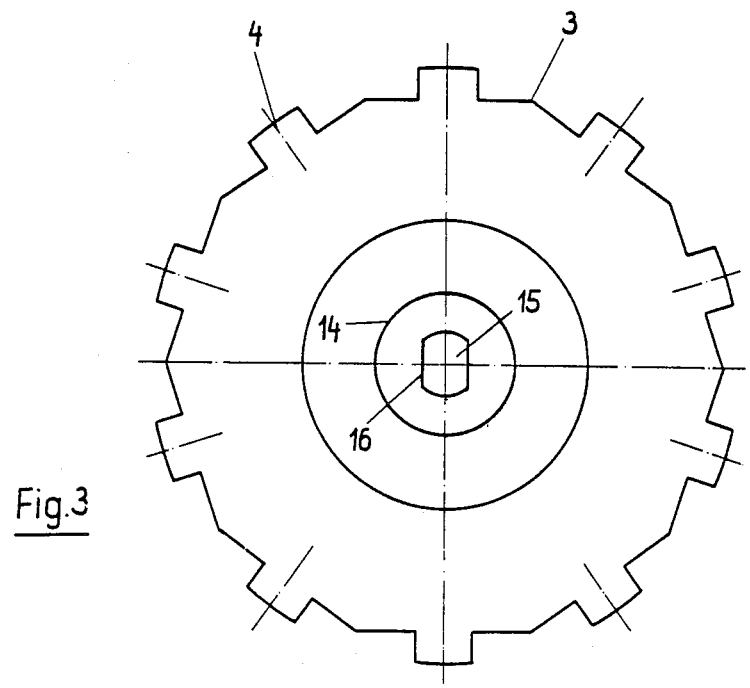
FIG. 3 is a view of the end of the FIG. 2 pressure roller that is arranged to connect to a drive shaft of the apparatus.

The manner of mounting of the pressure rollers 2 and 3 can be seen clearly from FIGS. 2 and 3, and in particular from FIG. 2. One end of each roller 2, 3 is connected via a respective quick-release coupling 13 to 17 to the drive shaft (not shown) of a respective motor. Each coupling includes an adaptor 13 which is connected in a manner not shown to the corresponding motor drive shaft. On its side facing towards the pressure roller 2 or 3, the adaptor 13 is formed with a stepped bore. The larger diameter portion of the stepped bore receives a projection 14 of the corresponding pressure roller and thereby provides support for the roller, while the smaller diameter portion 17 of the stepped bore receives a drive-transmission piece 15 of the pressure roller 2 or 3. In order to fulfill its drive-transmitting function the piece 15 is formed with appropriate flat zones 16 on two opposed sides while the inner portion 17 of the stepped bore is made of complementary form. Due to this arrangement not only is each pressure roller reliably entrained for driving purposes, but the pressure roller can easily be withdrawn from the stepped bore for replacement. Easy withdrawal of the pressure roller is made possible by arranging for the opposite end of the pressure roller 2 or 3 to be mounted, not directly in a section of the frame 1, but in a separate bearing disc 18 releasably connected to the frame. The bearing disc 18 has an inner bore in which a plastic bush 19 is inserted to serve as a plain bearing. A stub axle 20 projecting from the corresponding end of the roller 2 or 3 engages in the bush 19 whereby to mount the roller in the bearing.

Each bearing disc 18 is located in a corresponding aperture in the frame 1. The outside diameter of the bearing disc 18 is slightly larger than the diameter of the pressure roller 2 or 3 enabling the roller to be withdrawn through the frame aperture locating the disc 18. The bearing disc 18 is normally held in place in the frame 1 by a stop ring 21 integral with the disc 18 and of greater diameter than the outside diameter of the disc. Advantageously, the stop ring 21 is connected to the frame by a quick-release coupling 22, e.g. a bayonet-type locking coupling.

From the foregoing it can be seen that the pressure roller 2 or 3 can be easily and speedily replaced. To effect such an operation, it is simply necessary to undo the quick-release coupling 22 between the stop ring 21 and the frame 1, whereupon the bearing disc 18 can be removed and the pressure roller 2 or 3 can be withdrawn from the stepped bore in the adaptor 13 (in FIG. 2 to the left).

Figure 4:
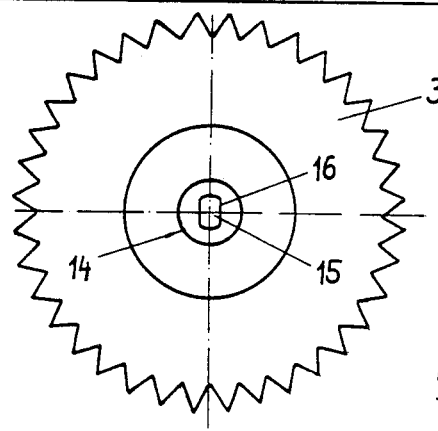
FIG. 4 is a view similar to FIG. 3, but on a reduced scale, showing a different form of roller to that of FIG. 3.

Instead of pressure rollers with ribs 4 of rectangular cross-section, other shapes of rollers may also be used, e.g., as shown in FIG. 4 which illustrates pressure rollers with saw teeth or of gear-like form. Similarly, pressure rollers with individual projections are also possible, or rollers whose surfaces are simply roughened or provided with shallow grooves, e.g. for pressing breadcrumbs into cutlets.

In use of the apparatus, a minimum inlet gap between the rollers 2, 3 is first set in dependence on the type of meat product to be treated. Thereafter a preselected pneumatic pressure is set and applied to the cylinder 7 by associated control means (not shown) and the motors driving the rollers 2, 3 are started. A meat product to be treated is then fed down the funnel 9 between the rollers 2 and 3 where its muscle fibre and protein cells are crushed and torn open. A reaction force is exerted by the meat product on the roller 2 and if this force is not balanced by that applied to the roller by the cylinder 7, the swivel arm 5 pivots in an appropriate direction to automatically adjust the spacing between the rollers 2, 3. In this way, different thicknesses of meat product to be treated, e.g. cured hams, can be subjected without difficulty to treatment under a preselected pressure which to a large extent remains constant.

The driving of the two pressure rollers 2 and 3 is preferably effected by separate motors as this makes it easier to rotate them in opposite directions (their directions of rotation being shown by arrows in FIG. 1) and at appropriate speeds, namely at different speeds. In this way, in addition to effecting treatment under pressure of a meat product, a shearing action can also be obtained, whereby an even greater crushing or opening up of the fibrous structure of the meat is achieved together with an even greater opening up of the protein cells.

Naturally, the embodiment described may also be constructed about a horizontal feed axis instead of the vertical one shown. In this case, a product to be treated will be introduced between the two pressure rollers, which are arranged one above the other, by means of a conveying device, e.g. a conveyor belt. It is also possible to use for this purpose an inclined chute since as soon as a product to be treated is engaged by the ribs 4 of the pressure rollers 2 and 3, it will be automatically drawn into the apparatus.

I claim:

1. In a system for preparing cured meat products in which a meat product is subjected to a pretreatment preparatory to being injected with a brine solution and subjected to an after treatment for absorbing said brine solution into said meat product, the improved pretreatment means for facilitating the injection of said brine solution into, and the absorption thereof by, said meat product which comprises: a frame to which is affixed at least one frame section for mounting a first removable pressure roller; at least one arm pivotally connected to said frame for mounting a second removable pressure roller in parallel relationship to said first roller thereby providing a gap between said rollers through which said meat product can be passed; a pneumatic cylinder pivotally connected at its one end to said frame and at its other end by its piston rod to said arm whereby said second roller can be displaced with respect to said first roller in response to the size of the meat product passing through said gap; means associated with said frame for establishing an adjustable maximum distance through which said second roller can be displaced towards said first roller thereby establishing a minimum dimension to said gap, said means comprising a cross member rigidly secured to said frame on which is provided an adjustable stop means adapted to contact said arm at the selected point of maximum displacement of said second roller towards said first roller; projections in the form of ribs of rectangular cross-sectional shape covering essentially the circumferential surface of each roller; means for rotating said rollers in opposite directions; and means for directing a meat product into and through the gap between said oppositely rotating rollers whereby the pressure of the circumferential ribs of said rollers on the meat product as it traverses the gap crushes the muscle fibers and tears apart and opens the protein cells thereof, thereby facilitating the subsequent injection of brine solution into, and absorption thereof by, said meat product.

2. The improved pretreating means according to claim 1 in which said ribs are in the form of teeth of wedge-shaped cross-section.

* * * * *